United States Patent Office 3,520,327
Patented July 14, 1970

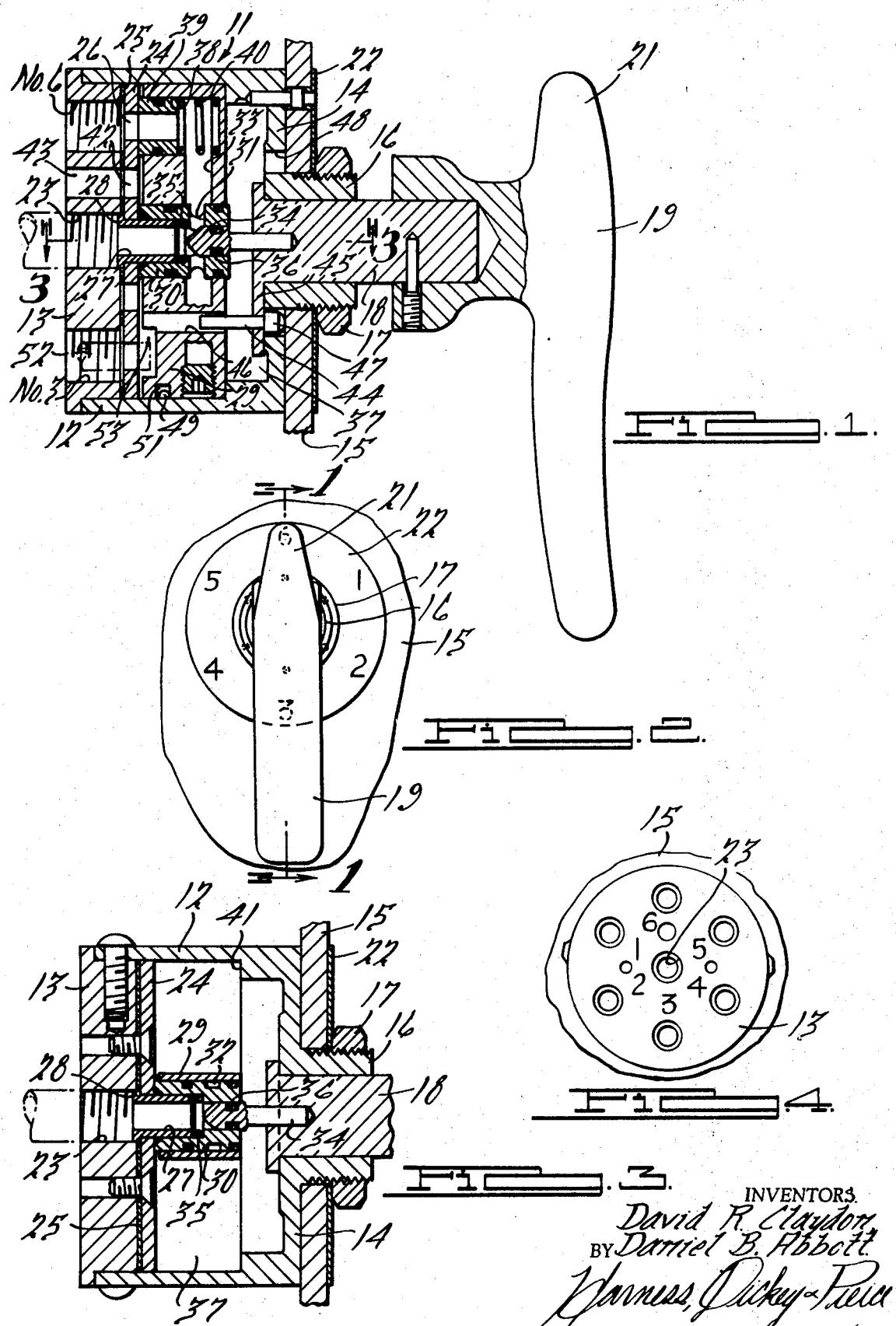

3,520,327
STATION SELECTOR VALVE
David R. Claydon, Royal Oak, and Daniel B. Abbott, Farmington, Mich., assignors to Ross Operating Valve Company, Detroit, Mich., a corporation of Michigan
Filed May 28, 1968, Ser. No. 732,693
Int. Cl. F16k 25/02, 11/02, 11/06
U.S. Cl. 137—556.6                    12 Claims

ABSTRACT OF THE DISCLOSURE

A combined reciprocating and rotary valve having circumferentially spaced working ports. Normally, one port is connected to a central supply port and the others are connected to exhaust. Inward axial movement of the handle first cuts off supply and then connects all ports to exhaust and permits rotation of the valve to any other desired port, no intervening ports being pressurized in the process. Release of the handle connects the newly selected working port to supply.

BACKGROUND OF THE INVENTION

Field of the invention

The invention relates to valves used for the random sequential pressurization of a plurality of working ports. For example, an automotive body drilling and punching unit may be used with several models arriving in random sequence along an assembly line. It may be desired to pressurize a like number of outlet ports in the same sequence to control this unit, each outlet port actuating a certain combination of tools. When switching between ports, however, one does not wish to pressurize any intervining ports.

Description of the prior art

Although it is known to have rotary selector valves which may pressurize a plurality of ports in random sequence, no structure is known which will do so without pressurizing intervening ports.

SUMMARY OF THE INVENTION

Briefly, the illustrated embodiment of the invention comprises a cylindrical housing with six circumferentially spaced outlet ports and a central supply port on one side thereof, and a rotary handle extending from the other side. A bar is rotatably mounted in the housing and has a radial passage connecting the supply port to a sleeve which may be aligned with any outlet port as the bar is rotated. The handle carries a three-way closed center crossover valve and is reciprocable from a normal outer position in which the bar passage is connected to supply, and an inner position in which this passage is connected to exhaust. When in its outer position the handle is locked against rotation, but when depressed it may be rotated along with the bar to which it is keyed. Thus, all ports will be connected to exhaust until the bar is rotated to its new position, upon which the handle and attached valve are permitted to return to their normal position, connecting the newly selected outlet port to supply.

BRIEF DESCRIPTION OF THE DRAWINGS

FIG. 1 is a cross-sectional view in elevation of the valve assembly shown in its normal position, taken along the line 1—1 of FIG. 2;

FIG. 2 is an end elevational view of the right-hand side of FIG. 1;

FIG. 3 is a fragmentary cross-sectional plan view taken along the line 3—3 of FIG. 1, and FIG. 4 is an end elevational view taken from the left-and side of FIG. 1.

DECRIPTION OF THE PREFERRED EMBODIMENT

The valve assembly is generally indicated at 11 and comprises a cylindrical housing 12 having end walls 13 and 14. The housing is shown as secured to a panel 15 by means of a threaded extention 16 passing through the panel and secured thereto by a nut 17. A handle shaft 18 is rotatably mounted in extension 16 and carries a handle 19 at the outer end thereof. This handle has a pointer 21 coacting with an index plate 22 mounted on panel 15. The index plate has indicia comprising six digits ranging from 1 to 6, these digits being equidistantly spaced and corresponding to six outlet or working ports in end wall 13 of the housing. Working port Nos. 3 and 6 are visible in FIG. 1, and all six ports are visible in FIG. 4.

A supply port 23 is centrally located in wall 13, and a thrust plate 24 within housing 12 is bolted to wall 13, a seal 25 being disposed therebetween. Thrust plate 24 has six apertured portions 26 aligned with port Nos. 1 through 6 and a central aperture through which extends a bushing 27 having a flange 28 and held by plate 24 at the inner end of port 23.

A bar 29 is rotatably mounted on a spool 30 fixed to and surrounding bushing 27. Spool 30 has circumferentially spaced working passages 31 leading from its interior to a circular groove 32. Bar 29 has a radial passage 33 connected with the interior of spool 30 through groove 32 and passages 31. The interior of the spool is normally connected to the supply pressure in bushing 27 when the parts are in their FIG. 1 position. However, handle shaft 18 carries a valve member 34 which is reciprocable in spool 30. This valve member has a nose-shaped end engageable with a seal 35 when valve member 34 is moved to the left from its FIG. 1 position. Further leftward movement will cause withdrawal of a seal 36 carried by member 34 from that portion of the bore of spool 30 to the right of radial passages 31 in FIG. 1. That portion of valve member 34 to the right of seal 36 is narrower than its nose-shaped end so that separation of seal 36 from the spool bore will connect passage 33 to housing chamber 37. Seals 35 and 36, together with valve member 34, thus form a three-way closed center crossover valve, since chamber 37 is connected to exhaust as will be later seen. Passages 31 and groove 32 form the outlet of this valve.

The outer end of bar 29 has a passage 38 extending axially from the outer end of passage 32 in which is disposed a sleeve 39 urged against thrust plate 24 by a coil spring 40. A shoulder 41 in chamber 37 limits rightward movement of bar 29, and the thickness of the bar is such that it will be separated from thrust plate 24. Aligned exhaust ports 42 and 43, in thrust plate 24 and housing end 13 respectively, are constantly connected with chamber 37. Thus, when the handle in in its right-hand position shown in FIG. 1, all port Nos. 1 through 6 will be connected to exhaust except that port with which sleeve 39 is aligned. On the other hand, when handle 19 is in its depressed position, all ports will be connected to exhaust.

Handle 19 is keyed to bar 29 by a pin 44 secured to a flange 45 at the other end of shaft 18. This pin extends into an axially extending hole 46 in that portion of bar 29 remote from sleeve 39. The head 47 of pin 44 is on the side of flange 45 facing end wall 14. This end wall has six apertures 48 equidistantly spaced and corresponding to the six locations of the outlet ports. The height of head 47 is such that when handle 19 is depressed sufficiently to close supply valve 35 and open exhaust valve 36, head 47 will be withdrawn from its aperture 48. Rotation of handle 19 will thus cause head 47 to face the interior surface of end wall 14 so that if handle 19 is released, it will not be returned to its normal position until head 47 is aligned with another hole 48. Thus, it is assured that all port Nos. 1 through 6 will be connected to exhaust as long as sleeve 38 is not aligned with one of the six outlet ports.

In operation, the parts will normally be as shown in FIG. 1, with one of the ports (in this case port No. 6) pressurized and the others connected to exhaust. Handle 19 and its associated parts will be held in the FIG. 1 position by the supply pressure acting on member 34. Assuming that it is desired to connect port No. 2 to supply pressure, handle 19 will be depressed, closing supply valve 35 and then opening exhaust valve 36. This will exhaust port No. 6, and handle 19 may be rotated until pointer 21 on the handle is aligned with No. 2 on index plate 22. As sleeve 39 passes port No. 1, this port will not be pressurized because passage 33 is connected to exhaust through chamber 37 and ports 42 and 43. When port No. 2 is reached, handle 19 will be released and the pressure upon member 34 will cause it to move to the right, head 47 entering the new hole 48. Fluid pressure will thus be supplied to sleeve 39 and thence to port No. 2.

It should be observed that various means could be employed for limiting rotation of bar 29. For example, a one-way clutch arrangement shown partially at 49 could be provided, carried by housing 12 and coacting with a recess 51 in an end of bar 29 adjacent housing 12. In this manner, rotation could be continuous in one direction but prevented in the other direction. Moreover, a stop pin such as that indicated partially in dot-dash lines at 52 could be placed in one or more outlet ports so that the rotor bar cannot travel past such pins. If such a stop pin is employed, a recessed portion 53 in the end of bar 29 remote from sleeve 39 will permit the bar to clear the stop until the head of the bar carrying sleeve 39 engages a stop.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

What is claimed is:

1. In a station selector valve, a housing, a plurality of circumferentially spaced working ports in said housing, a shaft rotatably and reciprocably mounted in said housing, means for rotating and reciprocating said shaft, supply and exhaust ports in said housing, a three-way valve connected to said supply and exhaust ports and having an outlet, a valve member forming part of said three-way valve and reciprocable with said shaft between supply and exhaust positions, a bar rotatably mounted in said housing and keyed to said shaft for rotation therewith, said bar having a working passage with one end connected to the outlet of said three-way valve and the other end connectable in random sequence to any of said working ports in response to rotation of said bar, means preventing axial movement of said valve member from its exhaust position except when said other end of the bar passage is connected to one of said working ports, means preventing rotation of said shaft and bar when said valve member is in its supply position, and means constantly connecting said exhaust port to all working ports not connected to said bar passage, whereby said working ports may be pressurized in random sequence without pressurizing any intervening working ports.

2. The combination according to claim 1, said housing being cylindrical, said working ports being in one end wall of said housing, said shaft extending through the other end wall thereof.

3. The combination according to claim 1, said supply port being centrally located in one end wall of said housing, said valve comprising a spool aligned with said supply port and receiving said valve member, said bar being rotatably mounted on said spool.

4. The combination according to claim 3, said shaft extending through the opposite end wall of said housing and being movable inwardly from its supply to its exhaust position, whereby fluid pressure at said supply port constantly urges said valve member and shaft outwardly toward its supply position.

5. The combination according to claim 1, said shaft extending through one end wall of said housing, said means for preventing axial movement of said valve member to its supply position comprising a head carried by said shaft within said housing and projecting toward said one end wall, said means for preventing rotation of said shaft comprising a series of circumferentially spaced recesses in said one end wall for receiving said head.

6. The combination according to claim 5, said head forming part of a pin which projects into a recess on said bar to form said key between the bar and shaft.

7. The combination according to claim 1, said means constantly connecting said exhaust and working ports comprising a chamber formed by said housing.

8. The combination according to claim 1, said housing being cylindrical, said working ports being formed in one end wall thereof, the working passage in said bar extending radially, an axial passage in the said bar extending from the outer end of said radial passage toward said one end wall, and a sleeve in said axial passage spring-urged toward said one end wall.

9. The combination according to claim 8, a thrust plate being disposed between said sleeve and said end wall and having apertured portions aligned with said working ports, the sleeve being slidable on said thrust plate.

10. The combination according to claim 8, said supply port being centrally located in said one end wall of said housing, said valve comprising a spool aligned with said supply port and receiving said valve member, said bar being rotatably mounted on said spool.

11. The combination according to claim 10, said shaft extending through the opposite end wall of said housing and being movable inwardly from its supply to its exhaust position, whereby fluid pressure at said supply port constantly urges said valve member and shaft outwardly toward its supply position.

12. The combination according to claim 11, said means for rotating and reciprocating said shaft comprising a handle fixed to the outer end thereof, a pointer on said handle, and an index plate adjacent said pointer connected to said housing and having indicia corresponding to said working ports.

References Cited

UNITED STATES PATENTS 3,080,570   3/1963   Weddendorf __ 137—636.4 XR

HENRY T. KLINKSIEK, Primary Examiner

U.S. Cl. X.R.

137—596.2, 614.17, 625.11, 625.26, 636.4